INVENTORS.
JACQUES URBACH
HAROLD W. WIENE
By Flam and Flam
ATTORNEYS.

May 9, 1972   J. URBACH ET AL   3,662,040
TECHNIQUE FOR LATHE GRINDING MULTIFOCAL CONTACT LENSES
Filed Jan. 8, 1970   5 Sheets-Sheet 2
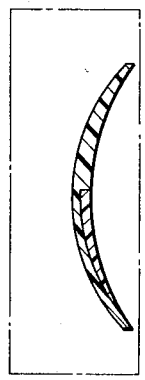
FIG. 10.
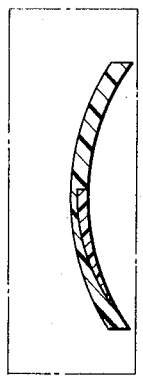
FIG. 11.
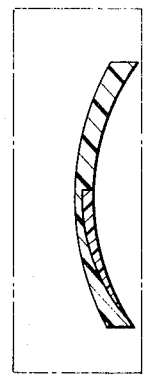
FIG. 12.
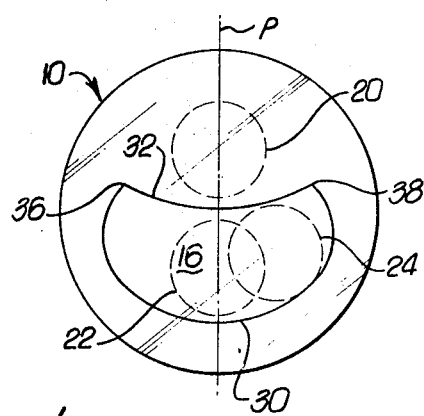
FIG. 9.
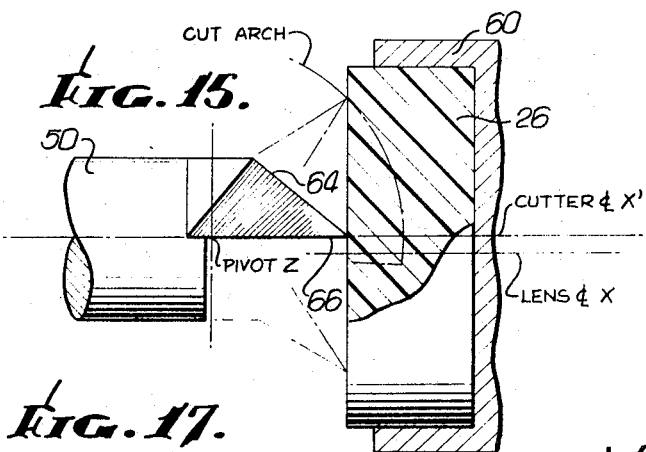
FIG. 15.
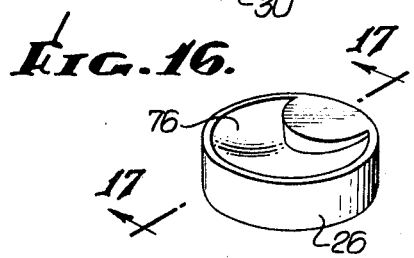
FIG. 16.
FIG. 17.
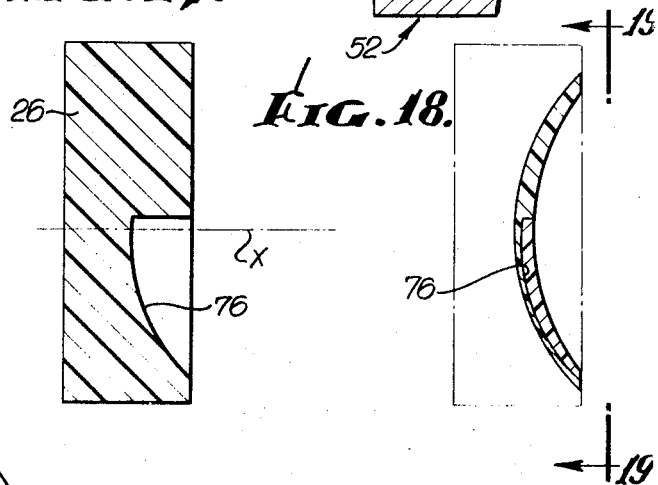
FIG. 18.
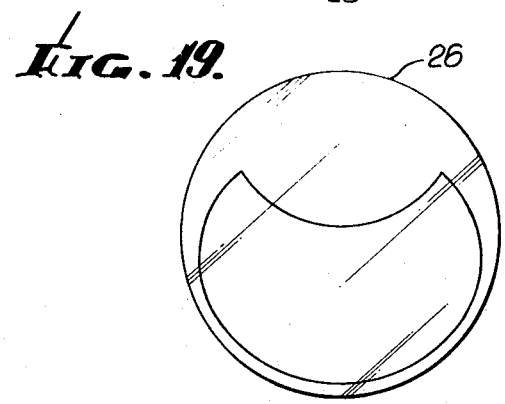
FIG. 19.
INVENTORS.
JACQUES URBACH
HAROLD W. WIENE
BY Flam and Flam
ATTORNEYS.

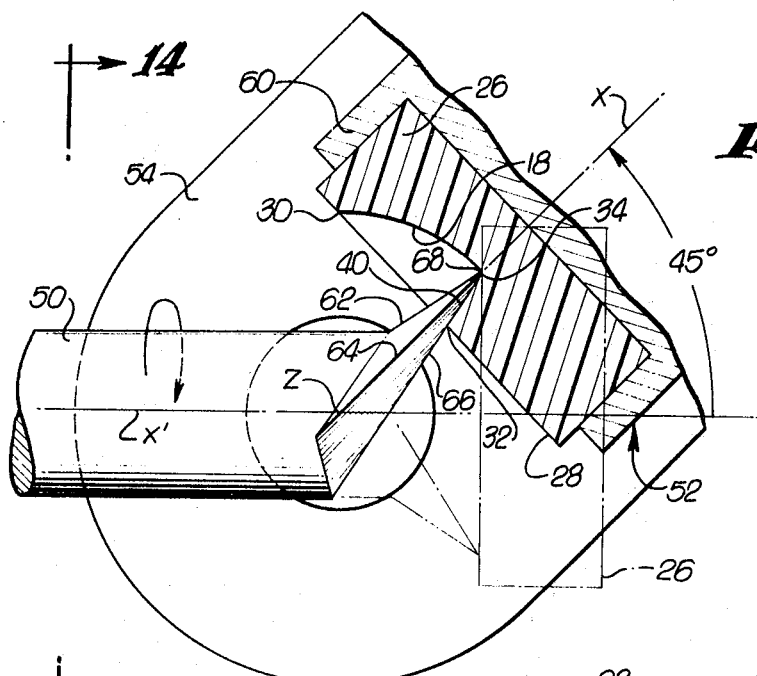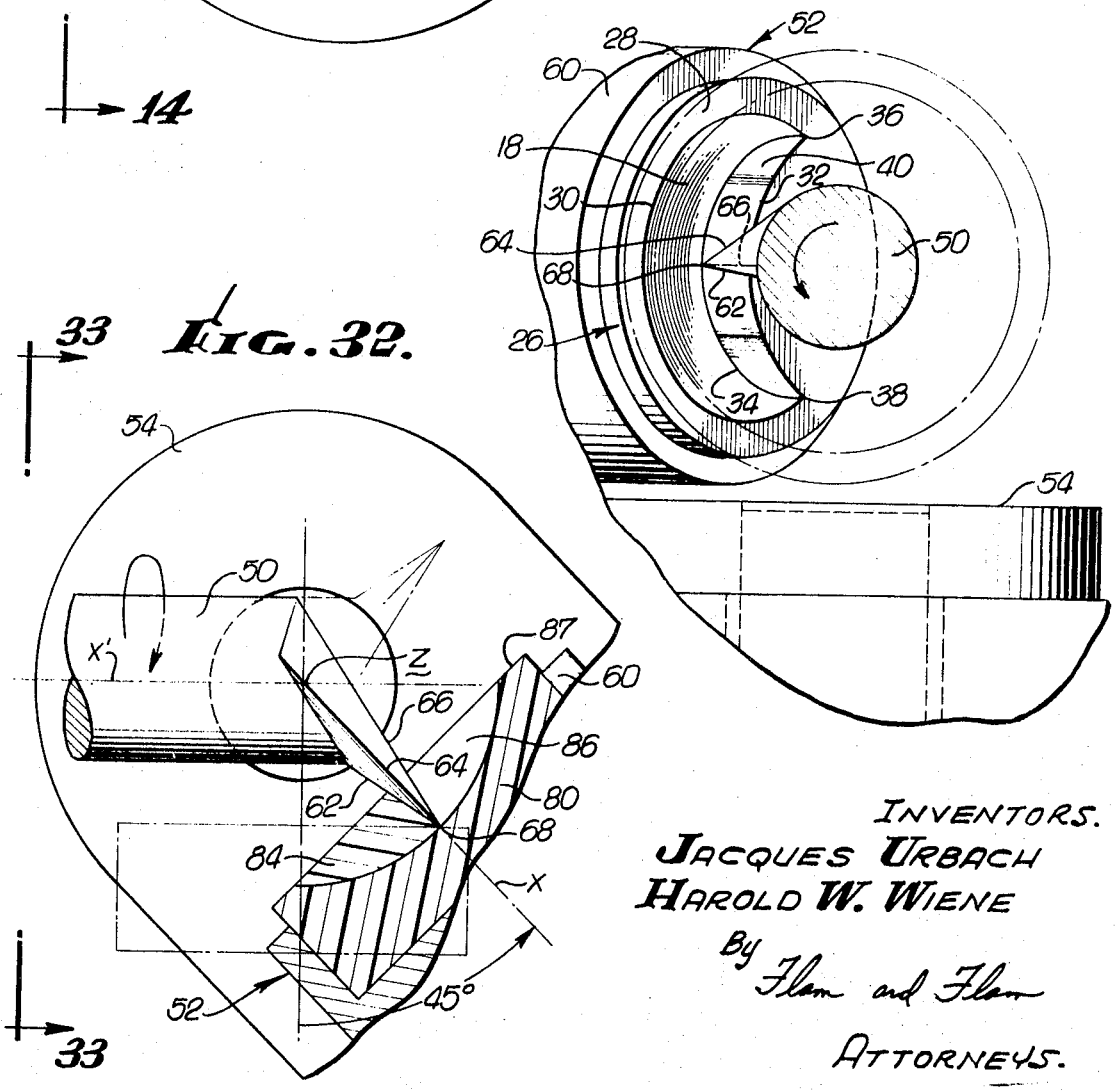

INVENTORS.
JACQUES URBACH
HAROLD W. WIENE

BY Flam and Flam

ATTORNEYS.

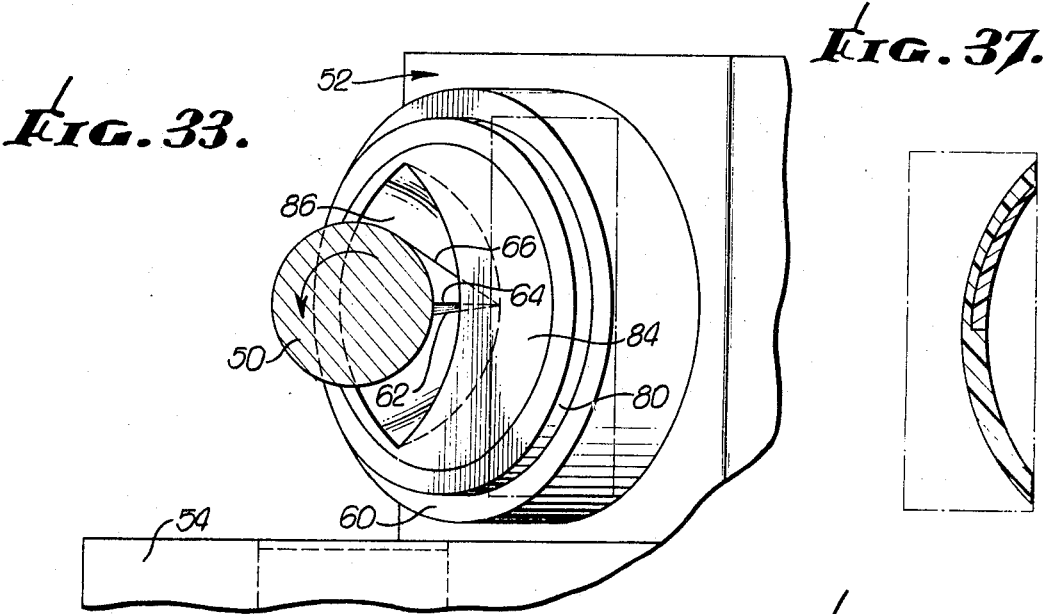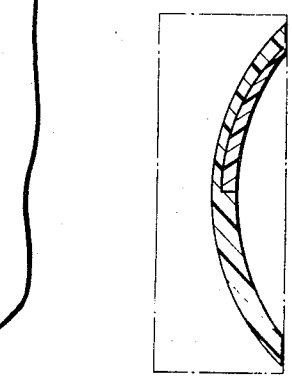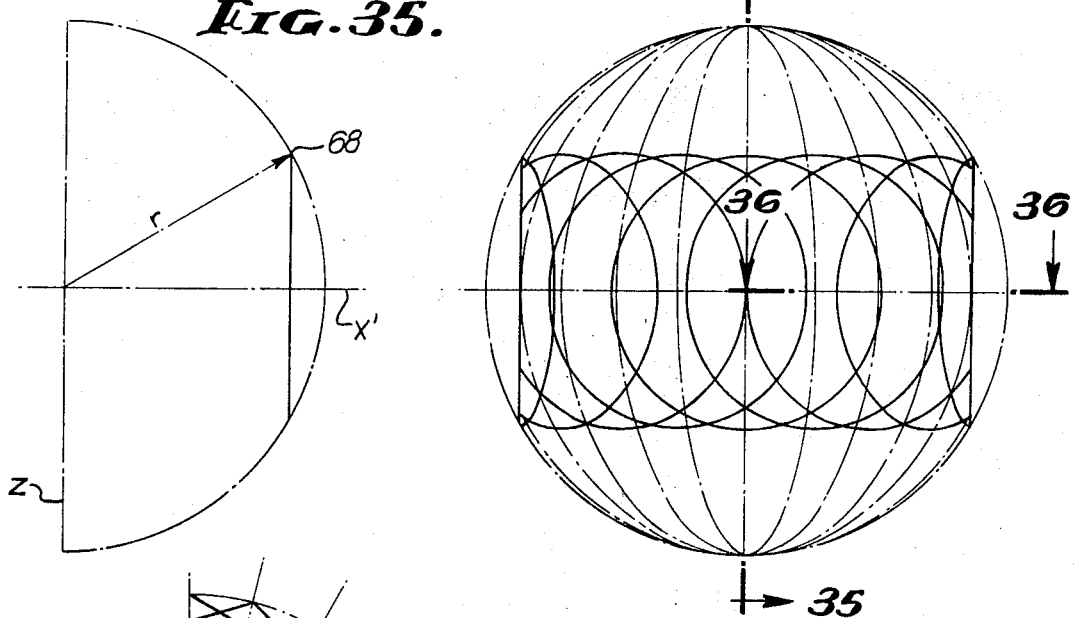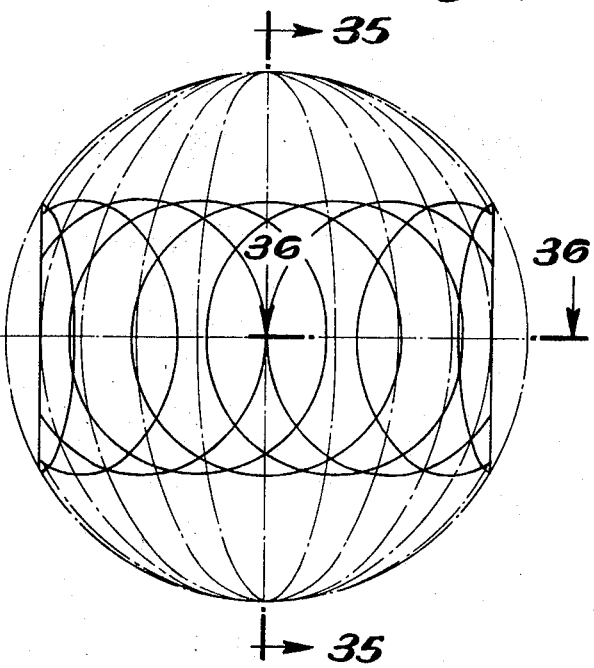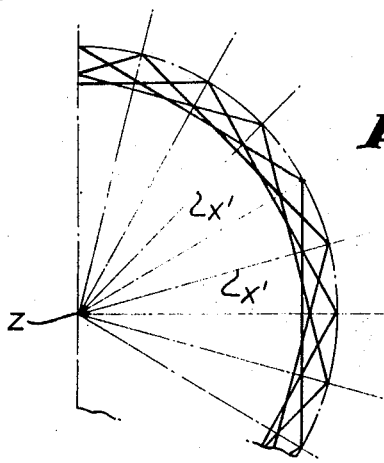
INVENTORS.
JACQUES URBACH
HAROLD W. WIENE
ATTORNEYS United States Patent Office 3,662,040
Patented May 9, 1972

3,662,040
TECHNIQUE FOR LATHE GRINDING MULTI-FOCAL CONTACT LENSES
Jacques Urbach, North Hollywood, and Harold W. Wiene, Pasadena, Calif., assignors to Uroptics International Incorporated, Los Angeles, Calif.
Filed Jan. 8, 1970, Ser. No. 1,444
Int. Cl. B29d 11/00
U.S. Cl. 264—1    8 Claims

ABSTRACT OF THE DISCLOSURE

A multifocal or bifocal contact lens is made on a convention radius turning lathe. The radius turning lathe has two supports, one for the work or lens blank and the other for the tool. The tool is rotated about an axis fixed on its support so that the point of the tool describes a circle. The blank is held fixed on its support. Upon relative angular movement of the supports, a spherical segment is cut in the blank, with the center of curvature falling along the axis of rotation of the tool whereby monocentricity is achieved. By such grinding technique, a segment for near view may be formed having a desirable configuration in which nasal rotation of the lens is noncritical.

BACKGROUND OF THE INVENTION

(1) Field of invention

This invention relates to contact lenses and particularly to techniques for making multifocal lenses.

(2) Discussion of prior art

Various criteria have been established for professional acceptance of bifocal contact lenses. A fundamental criterion is that the anterior and posterior surfaces of the contact lens must be of uniform, generally spherical curvature in order to avoid abrupt discontinuities that would discomfort the user. Contact bifocal lenses satisfying that criterion are made possible by forming a cavity in a lens blank and casting into the cavity a material having a different index of refraction. The anterior and posterior surfaces are then spherically ground by the aid of a radius lathe. A patent issued to Richard N. Camp on Aug. 30, 1966, No. 3,270,099, entitled "Method for Making Multi-Focal Length Contact Lenses," describes one method for making bifocal contacts by the aid of a composite lens blank.

There are two known processes for providing a cavity into which the segment material is cast: grinding and casting. By the aid of the casting method, the segment can have any desired configuration, for example, one in which the segment occupies a substantial area at the lower portion of the lens whereby nasal rotation of the lens does not result in operative segment misalignment. Dies for molding such special cavities are made only by laborious processes, and are thus quite expensive. Moreover, a substantial number of such dies must be provided in order to comply with various patient prescriptions.

Grinding techniques involve mere adjustments on a lathe in order to comply with various patient prescriptions. Grinding techniques are accordingly preferred for this reason. But heretofore it has not been possible to grind a blank to provide a suitable segment configuration because the desired segment configuration is nonannular, e.g., crescent shaped, whereas the ground segment necessarily provides an annular surface, that is, a surface formed by rotation of an arc about an axis passing through the center of the arc. The primary object of this invention is to make possible by lathe-grinding techniques the provision of cavities ground on a true radius that are not annular, whereby desired segment configurations can be achieved with the use of conventional radius lathes. Another object of this invention is to provide a technique for grinding nonannular segment recesses in which the center of curvature of the segment nevertheless falls on the center line of the lens whereby a monocentric structure results.

SUMMARY OF THE INVENTION

For this purpose, instead of rotating the work and swinging a tool along an arc, we rotate the tool so that its point describes a circle while the blank is held fixed in a carriage movable about a center transverse or perpendicular to the tool axis. By using this technique, the cavity formed, even though it is off center relative to the blank, nevertheless may have an axis falling substantially at the center of the lens blank. Accordingly, multifocal areas of the lens may be provided that fall on a common axis. This result has not heretofore been possible with known grinding techniques. Such coaxiality is necessary in order to eliminate image jump when the eye translates from one section of the lens with one focal length to another section of the lens with a different focal length. Camp achieves coaxiality by forming a cavity at the very center of the lens; an unusual and not altogether satisfactory bifocal structure results. In another form shown by Camp, the center of the cavity is offset. An image jump necessarily results. By using our technique, these disadvantages are obviated.

BRIEF DESCRIPTION OF THE DRAWINGS

A detailed description of the invention will be made with reference to the accompanying drawings. These drawings, unless described as diagrammatic or unless otherwise indicated, are to scale. The description of the invention is of the best presently contemplated modes of carrying out the invention. This description is not to be taken in a limiting sense but is made merely for the purpose of illustrating the general principles of the invention. Structural and operational characteristics attributed to forms of the invention first described shall also be attributed to forms later described unless such characteristics are obviously inapplicable or unless specific exception is made.

FIG. 9 is a front elevational view of the lens shown in FIG. 8.

FIGS. 10, 11 and 12 show contact lenses all having bifocal or close-reading segments substantially as shown in FIG. 9, FIG. 10 illustrating a lens with moderate positive correction for distance, FIG. 11 showing no correction for distance, and FIG. 12 showing a lens with moderate minus correction for distance.

FIG. 13 (Sheet 3) is a view similar to FIG. 2 but showing the radius turning lathe in the end position, the segment having been cut.

FIG. 14 is a transverse sectional view taken along a plane corresponding to line 14—14 of FIG. 13.

FIG. 15 (Sheet 2) is a view similar to FIG. 3 but illustrating a modified technique in which the lens blank is slightly offset to provide a larger segment area.

FIG. 16 is a pictorial view of a lens blank ground to provide a segment cavity in accordance with the technique illustrated in FIG. 15.

FIG. 17 is a vertical sectional view through the lens blank as indicated by line 17—17 of FIG. 16.

FIG. 18 is an axial sectional view of the lens completed except for its edge areas.

FIG. 19 is an elevational view of the posterior surface of the finished lens and taken along a plane indicated by line 19—19 of FIG. 18.

FIG. 32 (Sheet 3) is a view similar to FIG. 31 but showing the lens blank at a position in which the lens blank is completed.

FIG. 33 (Sheet 5) is a sectional view taken along a plane corresponding to line 33—33 of FIG. 32.

FIGS. 34, 35 and 36 are diagrams illustrating the manner in which a spherical surface is formed by a cylindrically rotating tool with relative rotation between the work and the tool about an axis perpendicular to the tool axis.

FIG. 37 is an axial sectional view of a modest negative correction lens made from a blank similar to FIG. 26.

DETAILED DESCRIPTION

Figure 7:
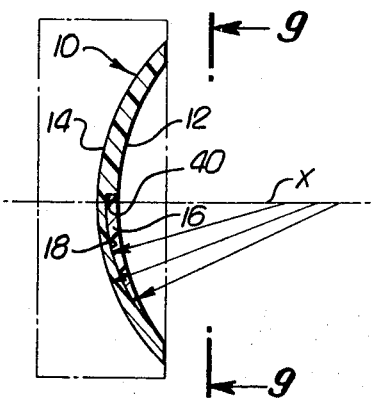
FIG. 7 is a similar sectional view showing the next step in the operation in which the anterior surface is formed.

The contact lens 10 shown in FIG. 7 has a posterior spherical surface 12 ground with a radius of curvature to conform to the curvature of the patient's cornea. The anterior surface 14 of the lens is ground on a different radius of curvature to provide the requisite distance correction. The lower portion of the lens has a segment 16 (see also FIG. 9) made of material having an index of refraction different from that of the main body of the lens. This segment is accommodated in a recess extending inwardly from the posterior surface 12 (FIG. 7). The bottom surface of the recess 18 for the segment is spherically ground with its center of curvature located at the center axis $x$ of the lens.

The upper region of the lens beyond the segment 16 (FIG. 9) is intended for distance viewing and the lower portion of the lens at the region of the segment is designed for close reading. When the user positions his eye to view objects at a distance, his pupil is located at the region indicated at the dotted line 20. When the user moves his eye downwardly for close reading, his lower lid stops the lens as his eye continues to move; his pupil ultimately moves into the region indicated by the dotted line 22. If the lens were at all times vertical, even a small segment would be operatively aligned with the pupil. But nasal rotation of the lens ordinarily occurs. Thus the axial plane $p$, while intended to be vertical, may become tilted so that the pupil occupies an area indicated by the dotted line 24. It is therefore important that the near segment 16 have a substantial crescent-like area.

Figure 1:
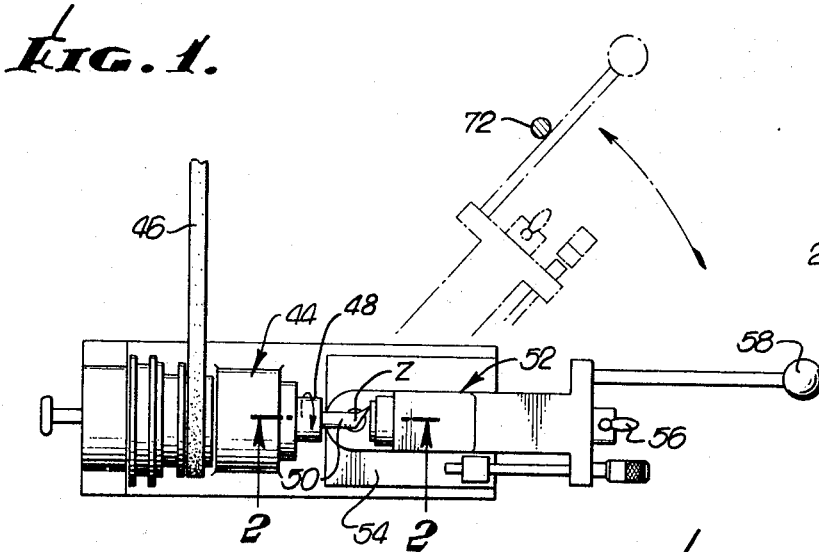
FIG. 1 is a diagrammatic view of a conventional radius turning lathe modified in order to grind a lens in accordance with the present invention.
Figure 3:
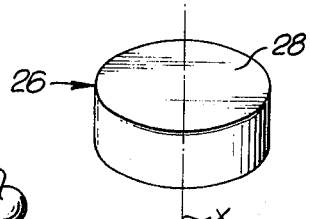
FIG. 3 is a pictorial view of the acrylic lens blank.

The interface at the bottom of the segment recess 18 is made by grinding a cylindrical lens blank 26 (FIG. 3) with the aid of a conventional radius turning lathe shown in FIG. 1. The lens blank 26 is made of acrylic or other materials well known in the art. The blank 16 shown in FIG. 3 has a flat circular surface 28 into which the crescent-shaped recess is carved. The recess (FIG. 4) is bounded by three arcs 30, 32 and 34 each terminated at two points 36 and 38 located on opposite sides of the surface 28. Two of the arcs 30 and 32 are located at the surface 28 and the third arc 34 extends inwardly. One arc 30 at the surface 28 is concentric with the lens axis $x$. The other arcs 32 and 34 are off center. The convex and concave sides of the arcs are all correspondingly oriented. The recess 18 is obviously nonannular.

A steep shoulder 40 is formed between the arcs 32 and 34 since the arc 34 lies generally beneath the arc 32.

Figure 5:
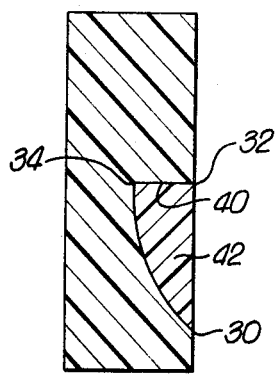
FIG. 5 is an enlarged axial sectional view showing the blank of FIG. 4 with the segment filled with polyester or other material having a suitable index of refraction.

After the recess 18 is formed, it is filled substantially to the level of the surface 28 with acrylic material 42 (FIG. 5) having an index of refraction different from that of the main body of the blank 26. The depth and curvature of the recess 18 are predetermined. The anterior and posterior surfaces 12 and 14, ground by conventional techniques, provide the requisite bifocal lens. The recess 18, however, is formed in the special manner illustrated in FIGS. 1, 2, 13 and 14.

The radius turning lathe has a headstock 44 the spindle cone of which is rotated by a belt 46. The spindle of the headstock has a check or holder 48 in which a cutting tool 50 (see also FIG. 2) is accommodated. The lathe has a carriage 52 mounted upon a saddle 54 that is pivotally movable about an axis $z$ perpendicular to the axis of the spindle. The carriage 52 may be moved toward and away from the axis $z$ by the aid of suitable dovetail guides between the saddle 54 and the carriage 52. For this purpose, a lead screw is provided that is operated by a handle 56. The carriage 52 and saddle 54 may be angularly moved as a unit about the axis $z$. A handle 58 is provided for this purpose.

Figure 2:
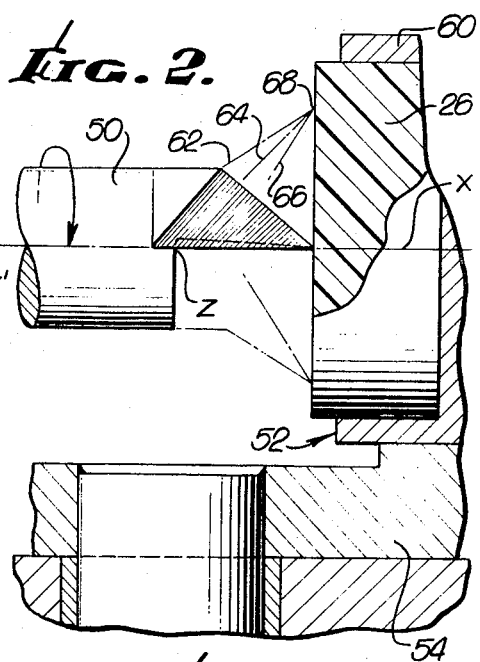
FIG. 2 is an enlarged fragmentary sectional view showing the tool and the lens blank at the center starting position and taken along a plane corresponding to line 2—2 of FIG. 1.

The carriage 52 has a chuck 60 (FIG. 2) in which the lens blank 26 is secured. In the present instance, the axis of the blank may, upon angular movement of the saddle, be moved into alignment with the tool axis. This starting position is shown in FIGS. 1 and 2; the face 28 of the blank is perpendicular to the axis of the tool 50. The tool has a head that projects laterally and forwardly of the tool shank and is bounded by three edges 62, 64 and 66 that converge at a point 68.

Figure 4:
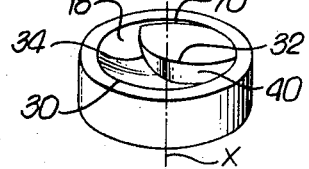
FIG. 4 is a pictorial view of the lens blank after it has been ground to provide the segment cavity.

To begin the cut, the carriage is advanced until the point 68 of the tool scores an annulus in the blank, as indicated at 70 (FIG. 4). After the annular groove 70 is formed, the carriage 52 and saddle 54 are rotated about the axis $z$, as shown in FIGS. 13 and 14. The lower part of the blank as viewed in FIG. 13 moves away from the tool point while the upper part moves into the circular orbit of the tool point. The forward edge 66 of the tool progressively scores the shoulder 40 (FIG. 14). When the blank is moved slightly from the on-center position, the incipient shoulder 40 is located close to the outer arcuate edge 30. As the blank tilts, the incipient shoulder moves across the face 28 of the blank 26. The shoulder 40 deepens. The tilting or swinging movement of the blank is stopped when the center of the shoulder 40 is substantially at the center of the lens. The limit is determined by a stop 72 (FIG. 1) positioned to be in the path of the handle 58. The position of the stop 72 may be adjusted. With the center of the shoulder substantially at the center of the lens, the corners 36 and 38 of the recess are located more than 180° from each other along the outer arc 30.

The bottom of the recess 18 is formed by the very point 68 of the tool. This surface is spherical, the radius of curvature corresponding to the distance of the point 68 from the intersection of the tool axis $x'$ with the swing axis $z$. If the blank were to be moved beyond the stopped position of FIG. 13 and the tool point 68 were to swing through the dotted-line arc shown on the blank in FIG. 13, the shoulder would disappear as the points 36 and 38 merge.

The surface so described would be a spherical segment with the center at the intersection of the axes $x'$ and $z$. FIGS. 34, 35 and 36 show how the point 68, moving in a circle, describes a spherical surface as the axis $x'$ of the circle swings about the axis $z$.

Figure 6:
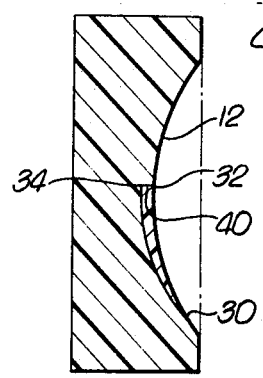
FIG. 6 is a sectional view similar to FIG. 5, showing the next step in the formation of the lens in which the posterior surface of the lens has been formed in a conventional manner by a radius turning lathe.
Figure 8:
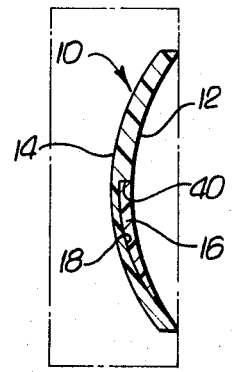
FIG. 8 is a similar sectional view in which the finished lens has its edges finished.

When the posterior surface 12 (FIG. 6) is cut in the lens, the outer arc 30 recedes inwardly (FIGS. 6 and 9) as the corners 36 and 38 recede along the inside arc 34. The arc 30 takes on an increased curvature or bowing at its ends due to the curvature of the cut. After the posterior and anterior surfaces are cut, the edges of the lens are trimmed, as indicated in FIG. 8, and thereafter finished. The final configuration is such as to achieve stability on the user's cornea. FIGS. 10, 11 and 12 show lenses of different distance correction made by the same process.

There are suitable verniers or dials associated with the handle 56 so that references are provided to determine the feeding movement of the blank. One of the references will correspond to coincidence between the $z$ axis and the face 28 of the blank. The distance between the $z$ axis and the face of the blank, however, does not correspond to the radius of curvature. Instead, it corresponds to the radius of curvature multiplied by the cosine of the angle formed between the axis of rotation of the tool and the line joining the intercept between the $z$ axis and the tool axis with the point of the tool. Suitable charts or curves available to the technician for each tool will provide a ready means whereby the radius of curvature of the cut part is determined.

In the form illustrated in FIGS. 15 through 19, the segment area is further enlarged by locating the axis $x$ of the blank 26 laterally of the axis $x'$ of the tool. The segment as shown in FIG. 16 results. The recess is filled as before with material having a different index of refraction. After the posterior and anterior surfaces are cut, the lens has the configuration shown in FIG. 18. In this instance, the center of the curvature of the recess 76 is slightly below the axis of the lens. A slight lack in monocentricity is largely offset by the increased segment area.

Figure 20:
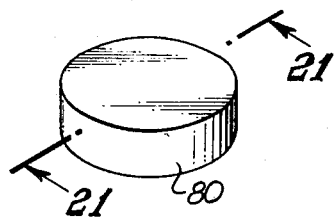
FIG. 20 (Sheet 4) is a pictorial view of a lens blank used in forming a still different segment configuration.
Figure 22:
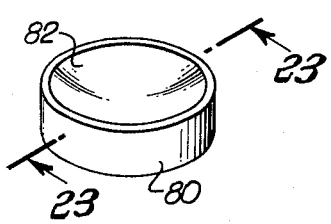
FIG. 22 is a pictorial view of the lens blank shown with a polished spherical cavity cut over the entire posterior surface of the lens.
Figure 24:
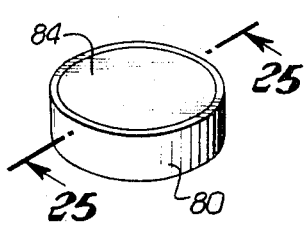
FIG. 24 is a pictorial view of the polished lens blank filled with high index material.
Figure 21:
FIG. 21 is an enlarged sectional view taken along a plane indicated by line 21—21 of FIG. 20.
Figure 23:
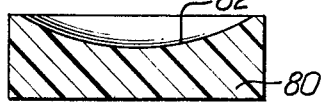
FIG. 23 is an enlarged sectional view taken along a plane corresponding to line 23—23 of FIG. 22.
Figure 25:
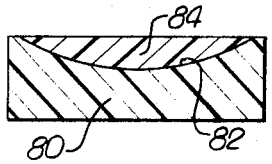
FIG. 25 is an enlarged sectional view taken along a plane corresponding to line 25—25 of FIG. 24.
Figure 26:
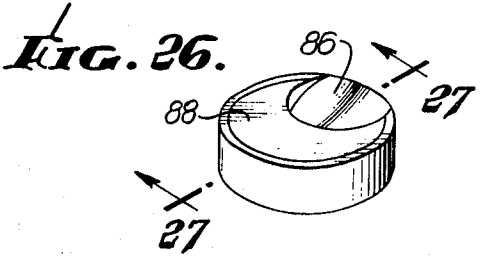
FIG. 26 is a pictorial view of the lens blank of FIGS. 24 and 25 ground to provide a small cavity at the region for distance view at the upper portion of the lens, leaving a large crescent-shaped segment for near view.
Figure 28:
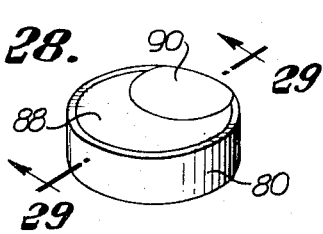
FIGS. 28 and 29 are views similar to FIGS. 26 and 27 but showing the blank filled with material that is the same as the body of the blank, FIG. 29 being a sectional view taken along a plane corresponding to line 29—29 of FIG. 28.
Figure 27:
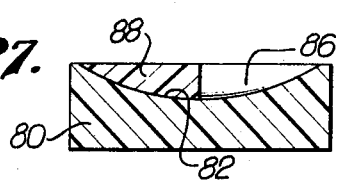
FIG. 27 is an enlarged sectional view taken along a plane corresponding to line 27—27 of FIG. 26.
Figure 29:
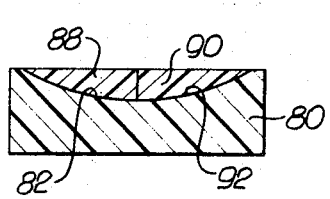
Figure 30:
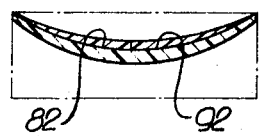
FIG. 30 is a sectional view of the lens finished from the blank of FIGS. 28 and 29.

A still larger segment area is provided without sacrifice of monocentricity by the method shown in FIGS. 20 through 33. For this purpose, a nonannular groove is cut, not in the region for near view but, instead, at the region for far view. The blank 80 (FIGS. 20 and 21) is first provided with an annular spherical cut (FIGS. 22 and 23) to provide the surface 82 at the bottom of the later formed segment recess. This spherical surface 82 is now readily polished due to its annular configuration. Next (FIGS. 24 and 25), the recess so formed is filled with acrylic or other suitable material 84 having an index of refraction differing from that of the blank for purposes of forming a close-reading segment. Next, a small, almost circular recess 86 (FIGS. 26 and 27) is formed adjoining the edge of the blank. This recess has a depth and curvature adequate to remove all of the deposited acrylic material 84 at the region of the cut. In practice, the center of curvature of the cut may coincide with that of the recess 82. A crescent-shaped segment 88 (FIGS. 26 and 27) results that is quite extensive and wide. The recess 86 is then filled with acrylic material 90 (FIGS. 28 and 29) that is identical to the material of the blank 80. Accordingly, the filled material 90 bonds precisely to the blank 80 so that the interface 92 disappears despite irregularities in the surface due to lack of polishing. The blank of FIGS. 28 and 29 is then ground to provide the finished lens shown in FIG. 30. The operative interface 82 between materials of different indices of refraction is readily polished when it is in annular form. An efficient lens is thus provided that is capable of being formed without difficult polishing operations. A similar technique can be used in the forms previously described by suitably changing the materials of the blank and the cast segment.

Figure 31:
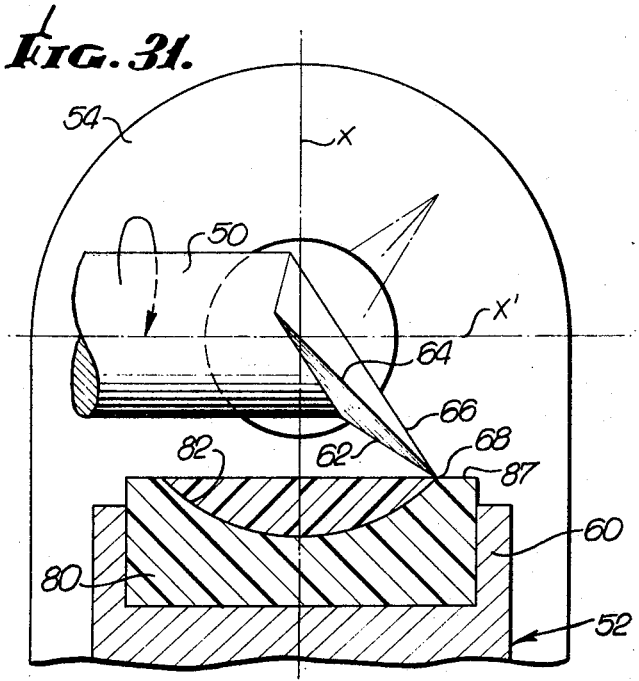
FIG. 31 is a view similar to FIG. 2 but illustrating the the manner in which the lens blank of FIG. 24 is formed on the radius turning lathe, the parts being shown at the start of the grinding operation.

In order to form the recess 86, the cutting tool 50 makes an inside or hook cut on the blank rather than an outside cut. Thus, at the starting position, the saddle 54 is oriented so that the surface 87 of the blank is parallel to the axis $x'$ of rotation of the tool as shown in FIG. 31. The carriage 52 is advanced until the circle described by the tip of the tool just makes contact with the surface 87. The saddle 54 and carriage 52 are then angularly moved in a direction to move the axis of the blank toward alignment with the tool axis. In the course of such movement, the inside or hook edge 62 is presented to the work rather than the outside edge 66. Movement progresses until the center of the shoulder cut by the inside tool edge 62 falls substantially at the center of the blank as shown in FIGS. 32 and 33. A stop (not shown) is provided as before. The curvature of the shoulder thus formed is quite substantial since the center of curvature of the shoulder is on the cavity side. A small circular area for far vision is accordingly formed. The surface formed by the tip of the tool is spherical, with the center of curvature falling at the intersection of the axes $x'$ and $z$ whereby a monocentric lens results.

Instead of first forming the spherical cut 82, the recess 86 could be formed in a blank of homogeneous material and the recess thereafter filled with material having a suitably different index of refraction. In this case, by suitable selection of materials, a properly fitted corrective lens can be made. While the surface of the recess 86 is not so easily polished due to its nonannular form, there are advantages when a negative distance correction is provided, as shown in FIG. 37. Thus the cast material tapers to a narrow thickness at the center of the lens. Since the lens edge is already thick due to negative correction, there is no added penalty.

The methods have been described with reference to the same tool. Obviously the tool can be modified to provide a shoulder of suitable angularity and inclination. Different tools can of course be provided for the various processes. The angularity of the inside and outside surfaces of the tool can be controlled so as to provide a shoulder that is substantially parallel to the axis of the lens whereby prism effects are largely eliminated. The methods have been described in which recesses are formed in a single cut. Obviously the recesses may be formed progressively by successive advancement of the carriage. The methods have been described in which the axis of the rotating tool is fixed, the work being moved in an arc. Obviously the work could be held stationary and the rotating tool swung about a transverse axis. The transverse axis need not be perpendicular; a slight, possibly desirable asymmetry in the segment configuration about the vertical lens axis would result, but monocentricity would yet be retained.

What is claimed is:
1. The process of making multifocal contact lenses which comprises:
(a) providing two supports, one for a lens blank and one for a tool having a point thereon;
(b) rotating the tool about an axis fixed with respect to its support with the point of the tool describing a circle;
(c) holding the blank in position on its support;
(d) relatively moving the supports about a pivot axis transverse to the rotary axis to cause interference between the tool point and the face of the blank;
(e) stopping the cutting operation before the point cuts through opposite sides of the blank to form a nonannular space for casting material into the blank;
(f) casting optical material into the blank;
(g) thereafter grinding anterior and posterior surfaces of the blank to prescription.

2. The process as set forth in claim 1 including the step of orienting the lens blank so that its ultimate optical axis may, upon angular movement of said supports, be substantially aligned with the axis of rotation of said tool.

3. The process as set forth in claim 1 together with the step of adjusting the orientation of the lens blank to determine the degree of offset between the ultimate optical axis relative to the axis of rotation of said tool to determine the relative size of the cut segment.

4. The process as set forth in claim 1 in which the relative movement of the supports is accomplished about an axis perpendicular to the axis of rotation of the tool.

5. The process as set forth in claim 1 wherein said tool has a leading edge adjoining the tool point, together with the step of cutting a shoulder in the blank with said tool leading edge whereby the cut segment is bounded at the surface of the blank by two correspondingly curved arcs.

6. The process as set forth in claim 1 wherein said tool has a trailing or hook edge, together with the step of cutting a shoulder in the blank with the trailing or hook edge of the tool whereby the cut segment is bounded at the surface of the blank by two oppositely curved arcs.

7. The process as set forth in claim 1 including the initial step of forming the blank by
(a) cutting an annular spherical segment in the blank,
(b) polishing the spherical segment,
(c) casting material into the segment that has a different index of refraction;
thereafter cutting the nonannular space; the subsequent step of casting material into the nonannular space using material having the same index of refraction as the material of said blank.

8. The process as set forth in claim 7 in which the nonannular space is cut at a depth and radius of curvature precisely to remove the first cast material.

References Cited
UNITED STATES PATENTS

| 1,871,123 | 8/1932 | Laabs | 51—284 X |
| 3,270,099 | 8/1966 | Camp | 264—1 |
| 3,560,598 | 2/1971 | Neefe | 264—1 |

ROBERT F. WHITE, Primary Examiner

A. M. SOKAL, Assistant Examiner

U.S. Cl. X.R.
51—284; 264—162